US009246818B2

(12) United States Patent
Deshpande et al.

(10) Patent No.: US 9,246,818 B2
(45) Date of Patent: Jan. 26, 2016

(54) CONGESTION NOTIFICATION IN LEAF AND SPINE NETWORKS

(71) Applicant: Cisco Technology, Inc., San Jose, CA (US)

(72) Inventors: Sushrut Sudhakar Deshpande, Bangalore (IN); Aniket Lele, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 178 days.

(21) Appl. No.: 13/924,950

(22) Filed: Jun. 24, 2013

(65) Prior Publication Data
US 2014/0376373 A1 Dec. 25, 2014

(51) Int. Cl.
*H04L 12/801* (2013.01)
(52) U.S. Cl.
CPC ..................................... *H04L 47/12* (2013.01)
(58) Field of Classification Search
CPC ..... H04L 47/32; H04L 47/2441; H04L 47/11; H04L 47/263; H04L 47/10; Y02B 60/31
USPC .......... 370/232–237, 252, 351, 352, 389, 392
See application file for complete search history.

(56) References Cited

U.S. PATENT DOCUMENTS

| 5,115,429 A * | 5/1992 | Hluchyj et al. ............... 370/231 |
| 7,590,149 B1 * | 9/2009 | Bharali et al. ................ 370/468 |
| 7,864,764 B1 * | 1/2011 | Ma et al. ....................... 370/389 |
| 2006/0165049 A1 * | 7/2006 | Bou-Diab et al. ............ 370/351 |
| 2010/0097934 A1 * | 4/2010 | Hendel et al. ................. 370/237 |
| 2013/0148547 A1 * | 6/2013 | Page et al. ..................... 370/255 |
| 2013/0157653 A1 * | 6/2013 | Huang et al. .................. 455/423 |
| 2013/0215754 A1 * | 8/2013 | Tripathi et al. ............... 370/236 |

* cited by examiner

*Primary Examiner* — Andrew Chriss
*Assistant Examiner* — Peter Mak
(74) *Attorney, Agent, or Firm* — Meunier Carlin & Curfman LLC

(57) ABSTRACT

Methods and systems to alleviate congestion in leaf and spine network topologies. Control information may be advertised by spines regarding the leaves to which it is connected. The control information is advertised to other leaf switches connected to the advertising spine. The control information may include a destination leaf ID, an enroute spine ID, an FL flag and an FF flag. The FL flag is a "Flow Learn Flag," that is set by the advertising spine that a leaf switch toward which the spine may be facing congestion above at a first predetermined threshold level. The FF flag is a "Flow Freeze Flag," that is set when all links to the corresponding destination leaf identified are congested, and the congestion level has crossed a second predetermined threshold level.

20 Claims, 7 Drawing Sheets

CONGESTION NOTIFICATION IN LEAF AND SPINE NETWORKS

BACKGROUND

Many organizations, including businesses, governments, and educational institutions utilize computer networks that connect to a plurality of computing devices. The computing devices may be at the same or different locations and may be, for example, computers, servers, etc. Common types of computer networks include local area networks (LANs) and wide area networks (WANs).

In computer networks, one or more intermediate network devices (i.e., switches, bridges, routers, etc.) are often used to connect together the computing devices. Between the various intermediate network devices and the computing devices are wired or wireless connections, referred to herein as links. One or more consecutive links form a communication path that is usable to transfer information (in the form of packets) between the computing devices. Protocols exists to optimize routing among the intermediate devices. In such a configuration, there may be circumstances where congestion conditions exist at a particular intermediate device (e.g., a switch). Congestion avoidance often takes the form of back off algorithms and prioritization; however, these do not adequately address leaf and spine networks.

SUMMARY

In accordance with the present disclosure, there is provided a method for receiving control information generated by a first network device at a second network device, wherein the control packet comprises a first flag set in accordance with a total of all path capacity or link congestion being greater than a first predetermined threshold level and second flag set in accordance with the total of all path capacity or link congestion being greater than a second predetermined level; determining a destination location specified in the control information in accordance with a MAC address table, Routing Information Table or Switching Information Table; determining if a first flag is set, and if the first flag is set and second flag not set: and if so, creating an entry in the flow table; and forwarding to the destination entry using a spine node identified in the control information: determining if the second flag is set, and if so, forwarding to the destination using the flow entry if available for that traffic otherwise forwarding by avoiding a spine node identified in the control information. If none of the flags are set then forwarding is performed normally.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

DETAILED DESCRIPTION OF EXAMPLE IMPLEMENTATIONS

Generally methods, apparatuses and computer readable storage media are provided herein for creation and subsequent use of control information to alleviate congestion in leaf and spine network topologies. In a leaf and spine network, control information may be periodically advertised by spines regarding the leaves to which it is connected. The control information is advertised to other leaf switches not connected to the advertising spine. The control information may include a destination leaf ID, an enroute spine ID, an FL flag and an FF flag. The FL flag is a "Flow Learn Flag," that is set by the advertising spine as the control information of leaf switch toward which the spine may be facing congestion above at a first predetermined threshold level. For example, the first predetermined threshold level may be 70% of link capacity. The FF flag is a "Flow Freeze Flag," that is set when all links to the corresponding destination leaf identified in are congested, and the congestion level has crossed a second predetermined threshold level, e.g., 90% of link capacity. Details of the control information follow below with reference to FIGS. 5, 6A and 6B following an introduction to example computer networks and protocols.

Example Computer Network

Figure 1:
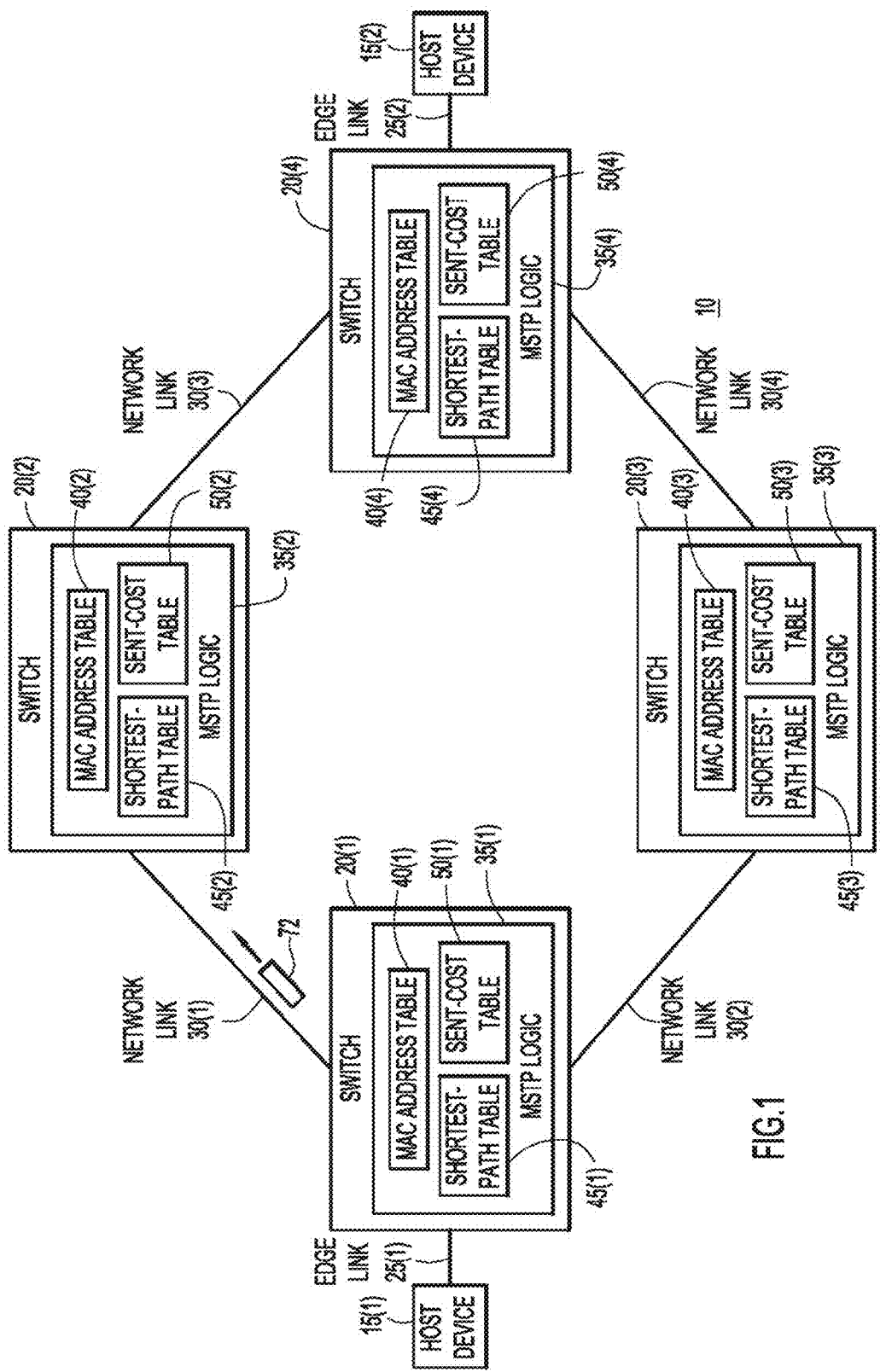
FIG. 1 is a block diagram of a computing network in which spanning trees are created in accordance with a multiple shortest-path tree (MSPT) protocol.

FIG. 1 is a block diagram of a packet switching computer network 10 that comprises a first host computing device 15(1), a second host computing device 15(2), and a plurality of intermediate network devices 20(1)-20(4). In this example, network 10 is an Ethernet local area network (LAN) and intermediate network devices 20(1)-20(4) are switches.

Computer network 10 enables host devices 15(1) and 15(2) to communicate, share resources, etc., through the exchange of data packets. Host devices 15(1) and 15(2) may be, for example, computers, servers, peripheral devices, etc. Data packets are transferred (routed) from a source host device (source) to a destination host device (destination) through the use of the switches 20(1)-20(4). In other words, switches 20(1)-20(4) are network devices that use a combination of hardware and/or software to direct packets through the network 10.

Host device 15(1) is connected to switch 20(1) via a wired connection (link) 25(1), while host device 15(2) is connected to switch 20(4) via a similar wired link 25(2). Links 25(1) and 25(2) are referred to herein as edge links because they are located at the edge of the computer network 10 (i.e., between a host device and an intermediate network device). Switches 20(1)-20(4) are interconnected with one another via wired links 30(1)-30(4) referred to herein as network links. More specifically, network link 30(1) connects switches 20(1) and 20(2), network link 30(2) connects switches 20(1) and 20(3), network link 30(3) connects switches 20(2) and 20(4), and network link 30(4) connects switches 20(3) and 20(4). A consecutive sequence of links collectively form a communication path over which data packets are sent. As used herein, data packets may include, for example, video data, numeric data, alphanumeric data, voice data, etc.

A spanning tree protocol, referred to as the multiple shortest-path tree (MSPT) protocol, may be used to calculate an active network topology that connects the host devices 15(1) and 15(2). The MSPT protocol is executed through the use of MSPT logic 35(1), 35(2), 35(3), and 35(4), in each of switches 20(1), 20(2), 20(3), and 20(4), respectively. For ease of reference, the example of FIG. 1 will be primarily described with reference to MSPT logic 35(1) and specific reference will not be made to the elements of MSPT logic 35(2), 35(3), and 35(4). MSPT logic 35(1) includes a media access control (MAC) address forwarding table 40(1), a shortest-path forwarding table 45(1), and a sent-cost table 50(1). MSPT logic 35(1), as well as MSPT logic 35(2)-35(3), may be implemented in any combination of software and/or hardware (e.g., as part of an application specific integrated circuit (ASIC)).

As noted above, there are two types of links in the example of FIG. 1; edge links 25(1)-25(2) and network links 30(1)-30(4). Edge links 25(1)-25(2) and network links 30(1)-30(4) are each full duplex (i.e., simultaneous two-way communication is permitted on the links). Because the MSPT protocol is primarily used for communication on the network links 30(1)-30(4), edge links 25(1)-25(2) may be detected (i.e., differentiated from the network links) by the absence of the MSPT protocol. The edge links 25(1)-25(2) could also be explicitly configured. Similarly, network links 30(1)-30(4) may be detected (i.e., differentiated from the edge links) by the existence of the MSPT control packets described below.

In a spanning tree protocol, such as the MSPT protocol, each of the switches 20(1)-20(4) will create a spanning tree over which traffic is forwarded in certain circumstances (i.e., broadcast, multi-cast, etc.). In this example, each of switches 20(1)-20(4) is the "root" of its own spanning tree and, as such, the number of spanning trees will be equal to the number of switches 20(1)-20(4).

It is to be appreciated that the computer network 10 of FIG. 1 is provided for illustration purposes only. The MSPT protocol is provided as an example spanning tree protocol, and related techniques may be executed in other networks that have more or less complex topologies. As such, the present disclosure should not be construed to be limited to the network 10 and/or the MSPT protocol.

Referring to FIG. 1, host device 15(1) first attempts to transmit a packet to host device 15(2). When such a packet is to be sent to the end host device 15(2), the packet is directed to the switch that is directly connected to the host device 15(2) (i.e., switch 20(4)). More specifically, in accordance with an example forwarding process, a switch will know where to forward a received packet (i.e., the destination of the packet) by examining the MAC address in the packet and a MAC address forwarding table and a shortest-path forwarding table stored on the switch. However, before a packet can be correctly forwarded, the MAC address table and shortest-path table should be populated. Additionally, in some circumstances, a packet may be, for example, flooded, broadcast, multi-cast, etc., from a switch.

In accordance with the techniques described herein, the control information that is used by the switches 20(1)-20(4) to create the spanning trees may be carried in the source MAC address field of special frames/packets. It is noted that the control information may be communicated using other mechanism. In some of the spanning tree creation techniques disclosed herein, the source MAC address field of a transmitted packet is modified to include the control information associated with the spanning tree being created. For ease of reference, the following examples are described with reference to the creation of a spanning tree for switch 20(1).

Figure 2A:
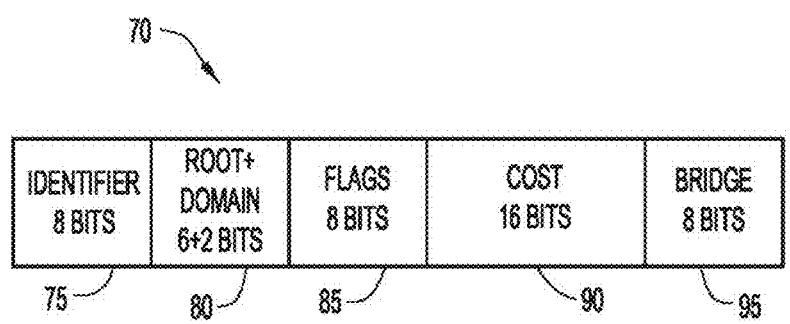
FIG. 2A is a schematic diagram of a source media access control (MAC) address field utilized to create a spanning tree in accordance with the MSPT protocol.

FIG. 2A is a schematic diagram of the format of a source MAC address field 70 in accordance with the MSPT techniques. This source MAC address field 70 and associated packet is generated by switch 20(1) directly connected to host device 15(1). In order to ensure that all other switches 20(2)-20(4) are made aware of and implement the spanning tree for switch 20(1), the control information (i.e., the packet having the source MAC address field of FIG. 2A) is send to the other switches 20(2)-20(4). FIG. 1 illustrates an example control packet 72 sent from switch 20(1) to switch 20(2).

In accordance with the example MSPT techniques, the source MAC address field 70 has a 48 bit length that includes the information that is to be stored in the database (tables) on each of the switches 20(1)-20(4) in order to properly forward later received packets along the spanning tree associated with switch 20(1). The first item in source MAC address field 70 is an eight (8) bit identifier 75. This identifier 75 indicates to later receiving switches 20(2)-20(4) that the source MAC address field 70 does not contain an actual MAC address corresponding to a device (i.e., an address for forwarding traffic), but rather that the source MAC address field 70 contains control information for creation of a spanning That is, when a later switch recognizes this identifier 75, the switch determines that this is a control packet and that the switch should not store this address in the MAC address table. Rather, the switch will send the control information to the control plane. This identifier is the first byte of the source MAC address field 70.

Source MAC address field 70 also includes an eight (8) bit Root+Domain segment 80. The first six (6) bits of this segment 80 include the root identifier (i.e., the identifier for the root switch). The root identifier is the identifier of the switch that forms the root of the spanning tree being created (e.g., switch 20(1)). Furthermore, in the present MSPT example, the network is divided into discrete logical areas referred to as domains. This logical division allows for network scaling and keeps the databases (tables) in the switches to manageable sizes. As such, the last two (2) bits in segment 80 identify the domain of the root switch.

Source MAC address field 70 also includes an eight (8) bit flag segment 85 that includes a plurality of flags. Such flags are not used in convention arrangements and further details of the flags are provided below with reference to FIG. 2B. A sixteen (16) bit cost segment 90 is also included in the source MAC address field 70. Cost segment 90 is used to identify the shortest path to the root of the subject spanning tree (i.e., the complete cost from the current switch to the root). This value is zero if the sender itself is the root. That is, the cost is zero at switch 20(1) because switch 20(1) is the root and there is no cost for the switch to reach itself.

The MAC address field 70 also includes an eight (8) bit bridge identifier 95. The bridge identifier 95 identifies the bridge (network device) for the particular root (i.e., which device sent the control information).

Figure 2B:
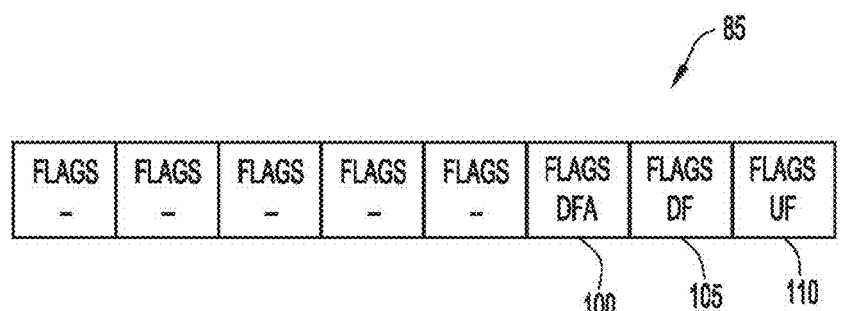
FIG. 2B is a schematic diagram of the flags utilized in the source MAC address field of FIG. 2A.

FIG. 2B is a schematic diagram of one example of flag segment 85 of FIG. 2A. More specifically, included in flag segment 85 is a first flag referred to as the downstream forwarding (DF) bit 105. The DF bit 105 is set if the sender device is nearest to the root on the current link. That is, on link 30(1) for the root of switch 20(1), the DF bit 105 would be set. Also included in flag segment 85 is a second flag referred as the upstream forwarding (UF) bit 110. The UF bit 110 is set when the sender device has found the link nearest to the root. That is, the UF bit 110 is set if the sender finds that the present link is the shortest path to take towards the root. The third flag in flag segment 85 is the DF acknowledge (DFA) bit 100 which is set if the sender accepts the other switch on this link as being closer to the root than itself. In such cases, the sender may forward the traffic towards the root using the current link. It is to be appreciated that the DFA bit 100 and the UF bit 110 are mutually exclusive. As such, if the UF bit 110 is set then the DFA bit 100 cannot be set. In addition to the above, the FL flag and the FF flag may be provided by utilizing predetermined bits in the flag segment 85.

Figure 3:
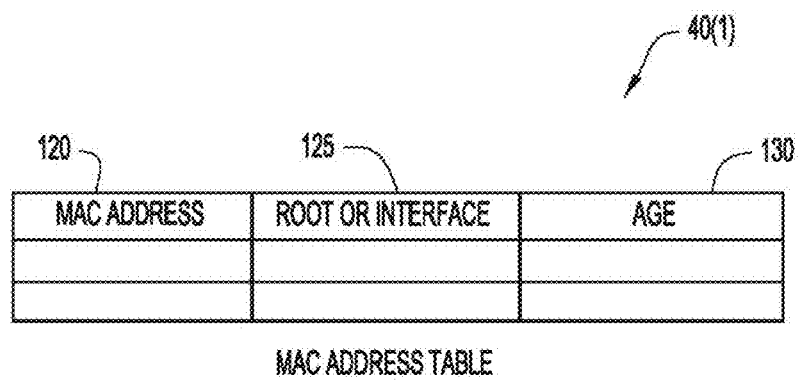
FIG. 3 is a schematic diagram of a MAC address forwarding table used in accordance with the MSPT protocol.

An example of a table used in accordance with the MSPT protocol is the MAC address forwarding table 40(1) shown in detail in FIG. 3. The MAC address forwarding table 40(1) includes a first column 120, a second column 125, and a third column 130. The first column 120 includes a MAC address and the second column 125 indicates if the corresponding MAC address in column 120 (i.e., the MAC address in the same row) is directly connected to another switch or it is directly connected to an interface on the same switch (itself). That is, column 125 is a field of bits that identify whether the corresponding MAC address points to an interface or to a root (i.e., a switch). A MAC address that is identified (learned) on edge ports will have an interface identifier in the second column 125, while a MAC address learned on non-edge ports will have the root identifier in column 125. The third column 130 indicates the age of the corresponding MAC address in column 120.

A control packet having the source MAC address field 70 is created and may be sent on all links by a first switch (e.g., switch 20(1)). In operation, when the control packet is created and sent, an entry for the corresponding root and outgoing interface will be examined. A sent bridge identifier will be the bridge identifier of the sending switch and the sent root identifier will be root of that tree. Additionally, the sent cost will be shortest root cost from the entry for the corresponding root in the sent cost table 50(1). The sent flags will be taken from the mysentflags field of the entry for the outgoing interface and the corresponding root in the shortest-path table 45(1). If there is no entry for that interface and/or the root, then the DFA flag 100 and the UF flag 110 are set to zero and the DF flag 105 is set to one. The results of this process could be cached regenerated following a detected change in entries. Therefore, as switch 20(1) comes up, it will create a control packet for itself (that includes the source MAC address field 70) and begin creation of spanning tree that has switch 20(1) as its root. The generated control packet is then sent to the other switches (e.g., switch 20(2)) for subsequent use and completion of the spanning tree for switch 20(1). The other switches will update the various fields (i.e., cost segment 90, flags segment 85, etc.) as the packet is forwarded through the network.

Initially, a switch 20(1) will only send out the control packet having the source MAC address field 70 (for a particular root) to its own tree because those are the only other switches known to the switch 20(1). However, as the switch 20(1) learns other trees, the packet having the source MAC address field 70 will be sent for those trees as well so that all switches become aware of all spanning trees (via the control information) that are in the network. In one example, it is possible to combine control packets for different roots into a larger frame.

Figure 4:
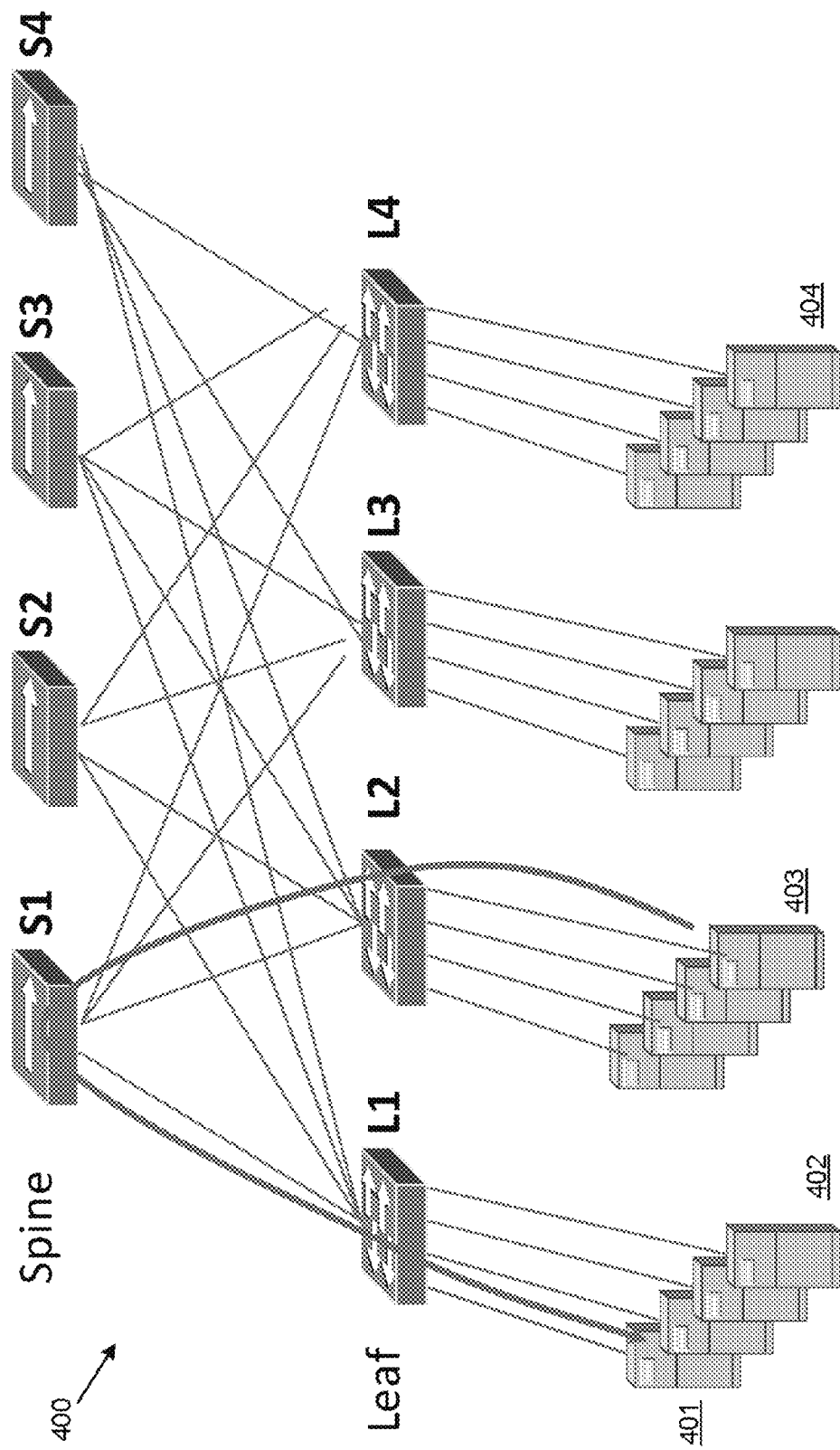
FIG. 4 is a schematic diagram of an example leaf and spine network.

FIG. 4 illustrates an example leaf and spine network 400 that may be implanted in the computer network 10. For example, the leaf and spine network 400 may be part of a two-tiered network design. The spines S1, S2, S3, S4 forward traffic along optimal paths between nodes at Layer 2 or Layer 3 while the leaves L1, L2, L3, L4 control the flow of traffic between servers (e.g., 401, 402, 403 and 404). In a data center, servers are centralized and connected to switches for performance and high resilience. This two-tiered leaf and spine architecture allows connections to be scaled from 100's to 10,000+ servers with high traffic and application workflows. At the spine, routing between nodes that have the highest traffic may be exchange. The flow is identified by the first 128 bytes of Layer 2 headers.

Figure 5:
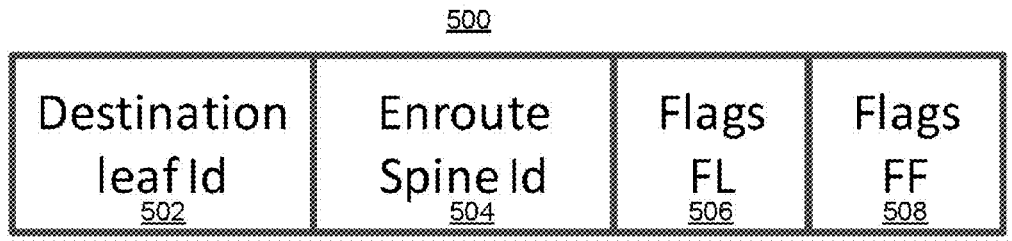
FIG. 5 is a schematic diagram of example control information sent to leaf nodes in the network of FIG. 4.

FIG. 5 illustrates control information 500 that may be periodically advertised by spines regarding the leaves to which they are connected. The control information 500 is advertised to other leaf switches not connected to the advertising spine. In some implementations, the control information 500 may be communicated in the control packet 72 within the flag segment 85 of the MSPT protocol. However, it is noted that the control information 500 may be embedded in any protocol that used to exchange topological information in a network. Yet further, the control information may be contained in a protocol such as Link Layer Discovery Protocol (LLDP). Thus, the control information 500 may be communicated to the leaves in a variety of ways in accordance with the present disclosure.

The control information 500 may include a destination leaf ID 502, an enroute spine ID 504, an FL flag 506 and an FF flag 508. When advertising, the particular spine may send its own ID as the enroute spine ID 504. The FL flag 504 is a "Flow Learn Flag," that is set by the advertising spine in the control information of leaf switch toward which the spine may be facing congestion above a first predetermined threshold level. For example, the first predetermined threshold level may be 70% of link capacity. The FL flag is reset after the congestion level drops below a first predetermined reset threshold. For example, the first predetermined reset threshold may be set to 70%. The FF flag 506 is a "Flow Freeze Flag," that is set when all links to the corresponding destination leaf identified in 502 are congested, and the congestion level has crossed a second predetermined threshold level, e.g., 90% of link capacity. The second predetermined threshold level is higher than the first predetermined threshold level. The FF flag is reset after the congestion level drops below a second predetermined reset threshold level. For example, the first predetermined reset threshold may be set to 90%. In some implementations, the first predetermined reset threshold and the second predetermined reset threshold maybe the same.

When a leaf receives a Protocol Data Unit (PDU) (e.g., as control packet 72) with the FL flag set (1) and the FF flag reset (0), the leaf switch will start learning the flows that go through the spine switch identified in 504 that are destined to the leaf switch identified in 502. The learned flows and the link on which that flow is forwarded may be added to a flow table maintain in the leaf switch. In accordance with some implementations, when the FL flag is reset, learned flows may be erased from the flow table. When a leaf receives a PDU with the FF flag set, then all the flows learned are frozen and no more flows are learned. Traffic for the learned flows will follow the path through the corresponding spine identified in 502. Any new flows destined to the leaf switch identified in 502 will use only the spine links without the FF flag set.

The control information 500 may be used to route traffic to avoid congested spine links. For example, traffic from server 403 may be routed to server 401 through leaf L2, spine S1 and leaf L1 en route to server 401. It may be that traffic along this flow is utilizing a large percentage of the bandwidth of the trunk links through spine S1. If server 404 wants to send traffic to server 402, this traffic may dropped because the links through spine S1 are nearly fully utilized. However, by using the control information 500, data from the server 404 that is destined for the server 402 may be routed instead through leaf L4, spine S2 and leaf L1 to reach server 402. Here, the control information 500 will indicate to these L2, L3 and L4 to stop sending new flows to S1.

Figure 6A:
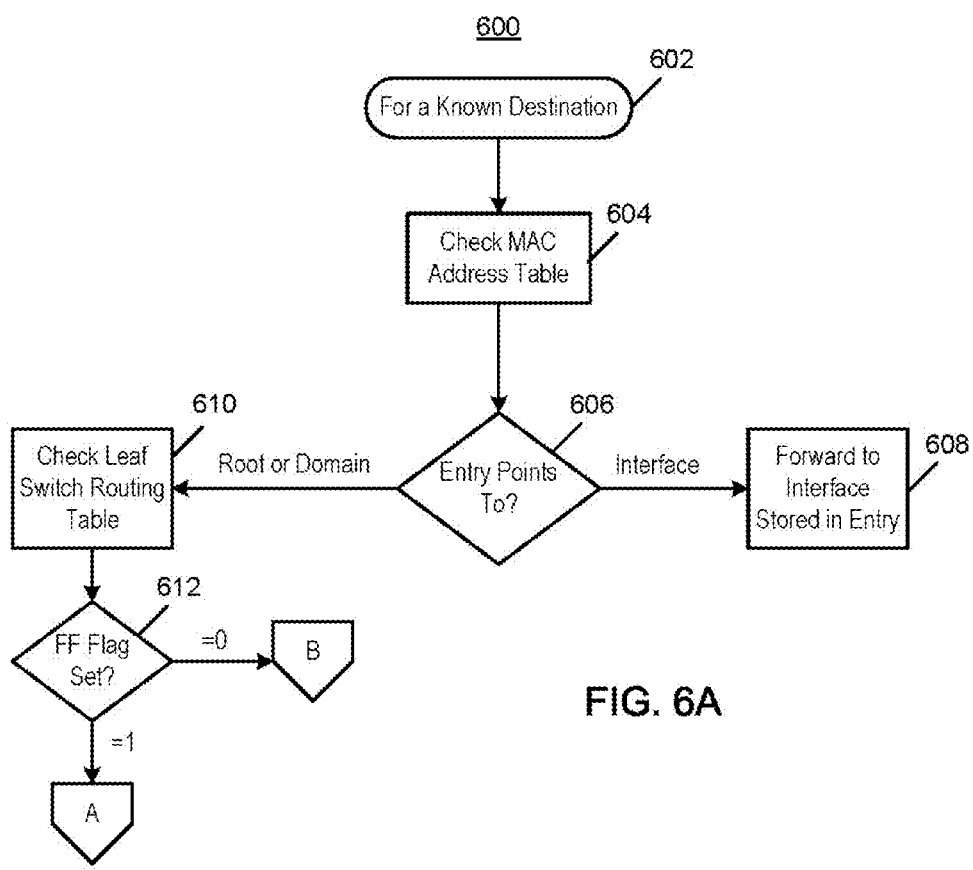
FIGS. 6A-6B illustrate a flowchart of an example method for congestion notification and processing in accordance with the present disclosure.
Figure 6B:
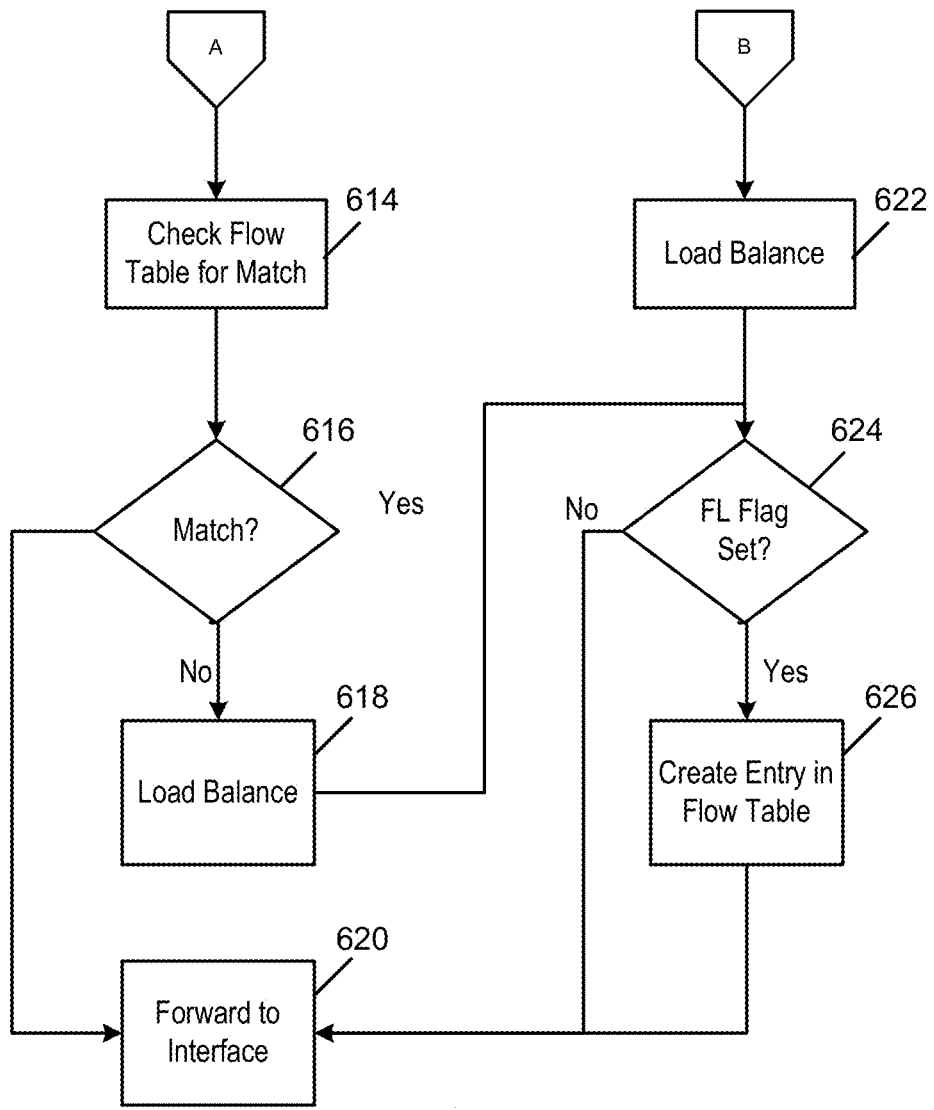

FIGS. 6A and 6B illustrate an operational flow 600 of a process by which the control information 500 may be used in the topology of FIG. 4 to avoid congested spine links. At 602, for any known destination of a received packet, a MAC address table may be checked at 604. For example, the MAC address may be checked in the MAC address table of FIG. 3. The MAC address table may be stored in each of the switches, and maybe created based on the control information 500. At 606, it is determined to what the entry in the MAC address table points. If at 606 it is determined that the MAC address points to an interface, then at 608, the packet is forwarded to the interface stored in the entry in the MAC address table.

If at 606, if the entry points to a root or domain, then at 610, a leaf is checked. At 612, it is determined if the FF flag is set for any of the paths towards the destination leaf. If the FF flag is set, the process continues at 614, where the flow table is checked for a match. The flow table may be stored in each of the switches. If a match is found at 616, then the packet is forwarded to the identified interface at 620. However, if a match is not found at 616, then load balancing is performed at 618. The load balancing form 618 may be performed using paths where the FF flag is not set with regard to the destination leaf switch. Next, at 624, it is determined if the FL flag is set for the selected path. If the FL flag is not set, then the packet is forwarded at 620 to the interface identified in the MAC address table. If at 624 FL flag is set, then at 626 and entry is created flow table, which notes the flow of the packet and the outgoing path selected. At 620, the packet is forwarded to the interface. If at 612, the FF flag is not set, then at 622 load-balancing is performed. The load-balancing performed 622 use all paths to the destination leaf switch, as no path is congested. At 624, it is determined if the FL flag is set for the selected path. If the FL flag is not set, then the packet is forwarded at 620 to the interface identified in the MAC address table. If at 624 FL flag is set, then at 626 and entry is created flow table, which notes the flow of the packet and the outgoing path selected. At 620, the packet is forwarded to the interface.

Thus the operational flow 600 utilizes the control information 500 to maintain various tables within the switches to route traffic based on congestion on links through various spine nodes reaching certain thresholds.

Figure 7:
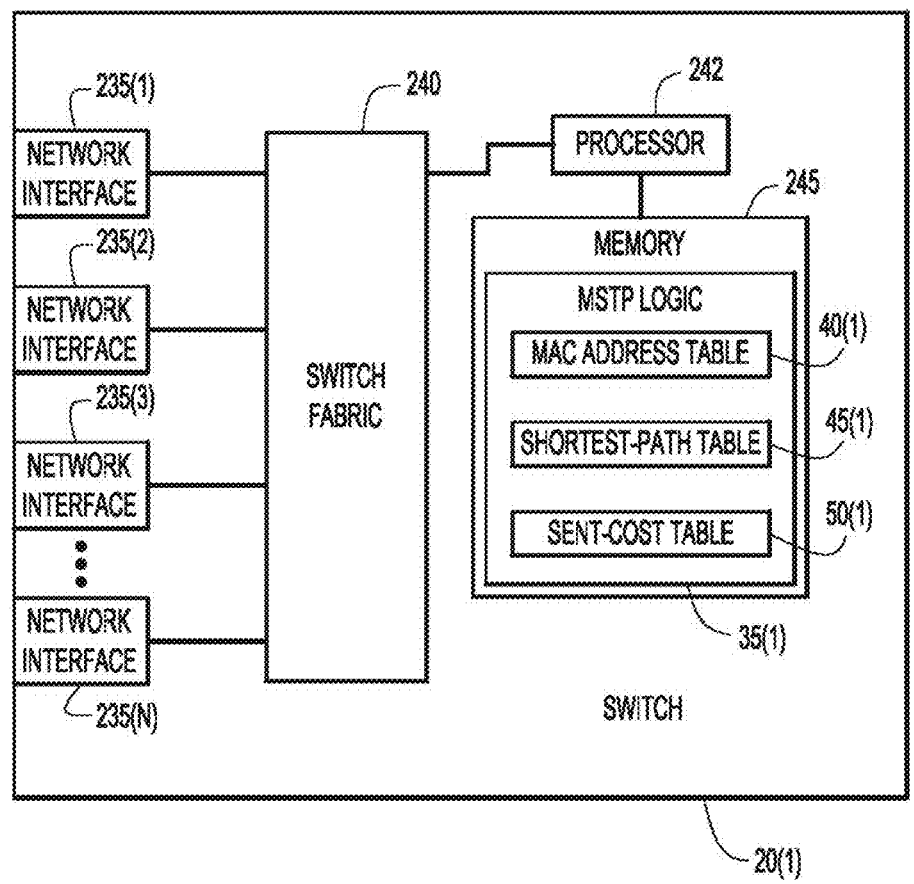
FIG. 7 is a block diagram of an example switch.

FIG. 7 is a block diagram illustrating further details of switch 20(1) of FIG. 1 configured to execute the MSPT protocol. Switch 20(1) comprises a plurality of network interfaces (ports) 235(1)-235(N), a switch fabric 240, a processor 242, and a memory 245. Memory 245 comprises MSPT logic 35(1); including MAC address forwarding table 40(1), shortest-path table forwarding 45(1), and sent-cost table 50(1).

Memory 245 may comprise read only memory (ROM), random access memory (RAM), magnetic disk storage media devices, optical storage media devices, flash memory devices, electrical, optical, or other physical/tangible memory storage devices. The processor 242 is, for example, a microprocessor or microcontroller that executes instructions for the MSPT logic 35(1). Thus, in general, the memory 245 may comprise one or more tangible (non-transitory) computer readable storage media (e.g., a memory device) encoded with software comprising computer executable instructions and when the software is executed (by the processor 242) it is operable to (or causes the processor to) perform the operations described herein in connection with MSPT logic 35(1).

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving control information generated by a first network device at a second network device, wherein a control packet comprises a first flag set in accordance with a total of all path capacity or link congestion being greater than a first predetermined threshold level and second flag set in accordance with the total of all path capacity or link congestion being greater than a second predetermined level;
   determining a destination location specified in control information in accordance with a MAC address table, Routing information Table or Switching Information Table;
   determining if the first flag is set, if the first flag is set and the second flag not set, and if so:
      creating an entry in a flow table; and
      forwarding to the destination location using a spine node identified in the control information;
   determining if the second flag is set, and if so:
      forwarding to the destination using the flow entry if available for that traffic, otherwise forwarding by avoiding a spine node identified in the control information; and
   determining if none of the first flag and the second flag is set, and if so forwarding normally.

2. The method of claim 1, if the second flag is set, the method further comprising checking a flow table for a matching entry to the destination entry, and if there is no match, performing load balancing to exclude the spine node identified in the control information with the second flag set.

3. The method of claim 1, further comprising maintaining the entry in the flow table until the link congestion falls below a predetermined reset threshold level.

4. The method of claim 1, wherein the method is implemented in a leaf and spine network, the method further comprising:
   receiving the control information at each leaf in the network; and
   learning flows from a first server to a second server in accordance with the first flag.

5. The method of claim 1, further comprising setting the first predetermined threshold level to 70% of a total of all path capacity.

6. The method of claim 1, further comprising setting the second predetermined threshold level to 90% of a total of all path capacity.

7. The method of claim 1, wherein a spine advertises the control information regarding the leaves to which it is connected to other leaf switches connected to the spine.

8. The method of claim 1, further comprising embedding the control information in a protocol used to exchange topological information in a network.

9. A non-transitory computer readable storage media encoded with software comprising computer executable instructions and when the software is executed operable to:
   receive control information generated by a first network device at a second network device, wherein a control packet comprises a first flag set in accordance with a total of all path capacity or link congestion being greater than a first predetermined threshold level and second flag set in accordance with the total of all path capacity or link congestion being greater than a second predetermined level;
   determine a destination location specified in control information in accordance with a MAC address table, Routing information Table or Switching Information Table;
   determine if the first flag is set, if the first flag is set and the second flag not set, and if so:
      create an entry in a flow table; and
      forward to the destination location using a spine node identified in the control information;
   determine if the second flag is set, and if so:
      forward to the destination using the flow entry if available for that traffic, otherwise forward by avoiding a spine node identified in the control information; and
   determine if none of the first flag and the second flag is set, and if so forward normally.

10. The non-transitory computer readable storage media of claim 9, if the second flag is set, further comprising instructions to check a flow table for a matching entry to the destination entry, and if there is no match, performing load balancing to exclude the spine node identified in the control information with the second flag set.

11. The non-transitory computer readable storage media of claim 9, further comprising instructions to maintain the entry in the flow table until the link congestion falls below a predetermined reset threshold level.

12. The non-transitory computer readable storage media of claim 9, wherein in a leaf and spine network, further comprising instructions to:
   receive the control information at each leaf in the network; and
   learn flows from a first server to a second server in accordance with the first flag.

13. The non-transitory computer readable storage media of claim 9, wherein the first predetermined threshold level is set to 70% of a total of all path capacity.

14. The non-transitory computer readable storage media of claim 9, wherein the second predetermined threshold level is set to 90% of a total of all path capacity.

15. The non-transitory computer readable storage media of claim 9, wherein a spine advertises the control information regarding the leaves to which it is connected to other leaf switches connected to the spine.

16. The non-transitory computer readable storage media of claim 9, further comprising instructions to embed the control information in a protocol used to exchange topological information in a network.

17. An apparatus comprising:
   a plurality of network interfaces;
   a memory; and
   a processor coupled to the network interfaces and memory, and configured to:
   receive control information generated by a first network device at a second network device, wherein a control packet comprises a first flag set in accordance with a total of all path capacity or link congestion being greater than a first predetermined threshold level and second flag set in accordance with the total of all path capacity or link congestion being greater than a second predetermined level;
   determine a destination location specified in control information in accordance with a MAC address table, Routing information Table or Switching Information Table;
   determine if the first flag is set, if the first flag is set and the second flag not set, and if so:
      create an entry in a flow table; and
      forward to the destination location using a spine node identified in the control information;
   determine if the second flag is set, and if so:
      forward to the destination using the flow entry if available for that traffic, otherwise forward by avoiding a spine node identified in the control information; and
   determine if none of the first flag and the second flag is set, and if so forward normally.

18. The apparatus of claim 17, the processor further configured to maintain the entry in the flow table until the link congestion falls below a predetermined reset threshold level.

19. The apparatus of claim 17, if the second flag is set, the processor is further configured to check a flow table for a matching entry to the destination entry, and if there is no match, performing load balancing to exclude the spine node identified in the control information with the second flag set.

20. The apparatus of claim 17, wherein in a leaf and spine network, the processor is further configured to:
   receive the control information at each leaf in the network; and
   learn flows from a first server to a second server in accordance with the first flag.

* * * * *